United States Patent
Phinney

(10) Patent No.: US 8,282,898 B2
(45) Date of Patent: Oct. 9, 2012

(54) PROCESS FOR THE FORMULATION OF POTASSIUM CHLORIDE FROM A CARNALLITE SOURCE

(75) Inventor: Robin Phinney, Okotoks (CA)

(73) Assignee: Karnalyte Resources Inc., Okotoks, Alberta (CA)

( * ) Notice: Subject to any disclaimer, the term of this patent is extended or adjusted under 35 U.S.C. 154(b) by 0 days.

(21) Appl. No.: 12/623,636

(22) Filed: Nov. 23, 2009

(65) Prior Publication Data

US 2011/0123420 A1 May 26, 2011

(51) Int. Cl.
*C01D 1/32* (2006.01)

(52) U.S. Cl. ...... 423/184; 423/208; 423/499.4; 423/155; 423/179; 423/497; 423/499.5; 299/5; 23/304; 23/302 R; 23/298; 71/31; 71/61; 71/63

(58) Field of Classification Search ........ 299/5; 23/304, 23/296, 298, 302 R; 423/184, 208, 499.4, 423/155, 179, 497, 499.5; 71/31, 61, 63
See application file for complete search history.

(56) References Cited

U.S. PATENT DOCUMENTS

| | | | | |
|---|---|---|---|---|
| 3,355,212 | A | * | 11/1967 | Day ................................. 299/5 |
| 3,644,102 | A | | 2/1972 | Svanoe |
| 3,994,531 | A | * | 11/1976 | Dillard et al. .................... 299/5 |
| 4,140,747 | A | * | 2/1979 | Sadan ........................... 423/163 |
| 4,385,902 | A | | 5/1983 | Haugrud |
| 4,504,092 | A | | 3/1985 | Bichara et al. |
| 7,780,941 | B1 | * | 8/2010 | Lalancette et al. ............ 423/544 |

FOREIGN PATENT DOCUMENTS

CA 2629876 A1 * 10/2009
SU 1261932 A * 10/1986

* cited by examiner

*Primary Examiner* — Melvin C Mayes
*Assistant Examiner* — Melissa Stalder
(74) *Attorney, Agent, or Firm* — Paul S. Sharpe; Perley-Robertson, Hill & McDougall LLP

(57) ABSTRACT

A process for formulating high purity potassium chloride from a carnallite source. The process takes advantage of solubility differences and saturation levels in a multiple salt system generated upon dissolution of carnallite. In the system, the sodium chloride is kept in solution and the magnesium chloride present in the system is controlled to be in a concentration range of between 12% and 25% by weight. This avoids co-precipitation of sodium chloride with the potassium chloride during crystallization and therefore prevents the sodium chloride from contaminating the potassium chloride. The result is high grade potassium chloride.

10 Claims, 13 Drawing Sheets

PROCESS FOR THE FORMULATION OF POTASSIUM CHLORIDE FROM A CARNALLITE SOURCE

FIELD OF THE INVENTION

The present invention relates to formulation protocol and more particularly, the present invention relates to a process for the formulation of high purity (high grade) potassium chloride from a source of carnallite.

BACKGROUND OF THE INVENTION

As is known in the fertilizer art, carnallite is a valuable compound in view of the fact that it contains potassium chloride, which is valuable to various industries and in particular, to the fertilizer industry. Carnallite is described by the formula $KCl-MgCl_2 \cdot 6H_2O$.

Currently, when potassium chloride ore is mined, it must undergo significant unit operations for upgrading, which is costly and significantly increases the price of this commodity. For example, a typical mine is at least a kilometre deep and is of the shaft variety. Accordingly, this involves a tremendous amount of expenditure in teens of the drilling of the shaft and additionally involves specialized tunnelling to accommodate work areas. Generally speaking, tunnels in these types of mines can exceed six kilometres in length and take inordinate amounts of time to drill. Once mined, the material must then be crushed, ground and deslimed as initial unit operations. Typically, this source of potassium chloride is affected by unacceptably high levels of salt (sodium chloride) contamination, which makes it un-saleable.

In order to diminish the quantity of sodium chloride present, the mined product must undergo flotation to remove the excessive sodium chloride. Once this is done, the product must then be dried and sized with further processing in terms of compaction and crystallization. One of the problems with the latter stages of processing is the storage aspect. Storing the potassium chloride for lengthy periods of time is problematic, since the product is inherently hygroscopic. This results in coagulation and agglomeration of the crystals in to lumps.

Even with the degree of flotation that is typically employed to produce a commercial grade of potassium chloride fertilizer, the existing product in the marketplace is typically impure and has occluded impurities as well as a significant degree of magnesium chloride and sodium chloride contamination.

In order to attempt to circumvent the limitations in conventional potassium chloride production, solution mining has been employed.

Solution mining is a widely known mining engineering technique and has been used extensively to extract evaporite values from subterranean formations for many years.

The intrinsic value of the evaporites is realized in the fact that contained potassium is the progenitor for potash production. The necessity of potash for crop production, animal feed inter alia is well known. The value of potash has increased and now approximates that of crude oil. The escalating price of potash is based on unprecedented pressure currently experienced by farmers for greater and greater food production. Demand has increased prices.

In U.S. Pat. No. 3,644,102, issued Feb. 22, 1972, Svanoe teaches a crystallization process of potassium chloride from the decomposition of carnallite. The process involves the use of potassium chloride crystals as seeding agents in a solution of carnallite and potassium chloride with crystallization of the crystals followed by separation from the initial mother liquor.

There is no provision in the teachings for preventing sodium chloride contamination.

Sadan, in U.S. Pat. No. 4,140,747, issued Feb. 20, 1979, provides a process for the production of potassium chloride and of magnesium chloride hexahydrate (bischoffite) from carnallite or from carnallite containing sodium chloride. In the process, carnallite is heated to a temperature of between above 70° C. and above 167.5° C. Solid potassium chloride is then separated. In the residual brine, carnallite is precipitated by evaporation or by lowering the temperature, and it is recycled to the starting stage. The residual solution consists essentially of magnesium chloride which is recovered as bischoffite.

Similar to the Svanoe document, the Sadan teachings do not specifically provide instruction for preventing significant sodium chloride contamination.

A process for the treatment of carnallitic ores is discussed in U.S. Pat. No. 4,504,092, issued Mar. 12, 1985, to Bichara et al. Carnallitic ores are treated with a decomposition-brine containing amounts of magnesium chloride, potassium choride chloride and sodium chloride for precipitating artificial sylvinite in a solution of magnesium chloride saturated in potassium chloride and NaCl. The invention relates to the addition to the decomposition-brine of a collector for the flotation of KCl and a source of gas, so as to contact newly formed crystal nuclei of KCl selectively with the collector and to contact bubbles of gas with the collector. This forms a froth enriched in KCl simultaneously with the decomposition of carnallite.

A technique for the purification of crystalline potassium chloride is set forth in U.S. Pat. No. 4,385,902, issued May 31, 1983 to Haugrud.

The method comprises leaching under isothermal conditions compacted particles of a particle size from 8 to 200 Tyler mesh of potassium chloride with an aqueous leaching solution. The solute of the solution is selected from potassium chloride and mixtures of potassium chloride and sodium chloride. The leaching solution is saturated with respect to potassium chloride and contains less than 45 grams of sodium chloride per litre of solution, for a time sufficient to reduce the sodium chloride content of the compacted particles and separating leached particulate potassium chloride product having a sodium chloride content of less than about 0.5 weight percent from the leaching solution.

In light of the foregoing, production has increased absent concomitant improvements in the existing solution mining techniques.

The techniques for solution mining currently followed involve the formation of a cavern into which water is injected as a solvent. This in and of itself is fine, however, volume control of the cavern is often uncontrolled and this results, depending on tectonics, in eventual subsidence of the formation. This is exacerbated by the fact that the formation pressure is not maintained during growth of the cavern. Accordingly, the mine is productive though with environmental consequences.

Perhaps one of the most significant limitations with existing techniques is the issue concerning tailings. By present methods, the tailings can be significant, require special handling and occupy large areas for storage.

It would be desirable to realize the benefits of solution mining in a carnallite deposit also having sylvinite contained therein without the limitations of existing methodology.

As is demonstrative of the existing limitations of the art, current process engineering of the potassium chloride results in a product that is at best 95% pure potassium chloride.

The present invention satiates the need for such a combination not only in the oil and gas industry, but also other industries where actuator driven arrangements are widespread.

SUMMARY OF THE INVENTION

One object of one embodiment of the present invention is to provide an improved process for formulating high grade potassium chloride.

A further object of one embodiment is to provide method of formulating potassium chloride from a source of carnallite, comprising:

provide a source of carnallite;
dissolving the source of carnallite;
forming a slurry from dissolved carnallite at least containing sodium chloride,
potassium chloride, and magnesium chloride;
dissolving the slurry to form a solution while maintaining the magnesium chloride concentration in a range between 12% and 25% by weight to prevent co-precipitation of sodium chloride with potassium chloride;
removing the sodium chloride; and
crystallizing potassium chloride from the solution with a sodium chloride of not greater than 2% by weight, whereby the potassium chloride has a high purity.

BRIEF DESCRIPTION OF THE DRAWINGS

Similar numerals used in the drawings denote similar elements.

DETAILED DESCRIPTION OF THE PREFERRED EMBODIMENTS

Figure 1:
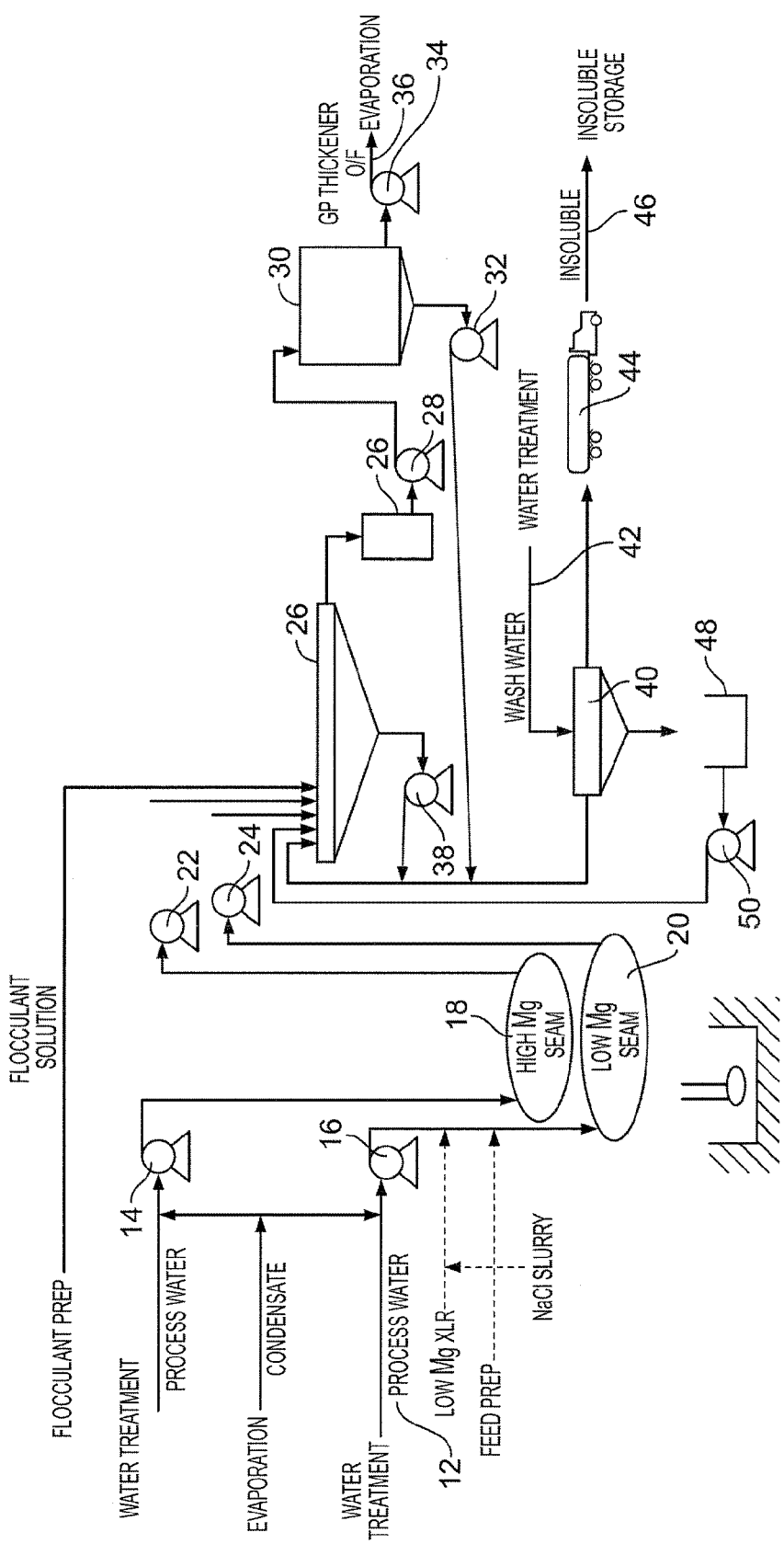
FIG. 1 is a process flow diagram depicting the solution preparation process.

As a preface, the overall process involves hot water injection into carnallite mineral beds underground to dissolve the minerals. The brine solutions from the top and bottom mineral beds are pumped to a potash processing plant located on the surface after the hot water has contacted the minerals and is almost fully saturated with the minerals.

The two brine solutions containing a small amount of insolubles are delivered to a solution preparation thickener where flocculant solution is added to flocculate the insolubles. The thickener overflow is forwarded to the storage tank before entering the evaporation area for further processing. The flocculated insolubles settle in the bottom of the thickener and are pumped to the solid-liquid separation stage where the insoluble solid is separated and transported by truck to the soluble storage to stockpile. The filtrate is recycled back to the thickener.

In the evaporation circuit, the brine solution, the liquid from the evaporation discharge solid-liquid separation and the bleed from the crystallizer circuit are concentrated in evaporators where the solution is heated, water is evaporated and steam formed used to heat up the incoming streams. The condensate is recycled and reused at various areas in the plant. The mixed NaCl/KCl solid slurry precipitated from the evaporator is delivered to the evaporation thickener. The thickener underflow is forwarded to a solid-liquid separation stage where the solid is discharged to the low Mg feed repulp tank. In normal operation, wash water is added to the solid-liquid separation to reduce Mg content in the solid cake and to control the amount of magnesium chloride entering the low Mg crystallization circuit. The liquid from the liquid-solid separation combined with the crystallization bleed is returned to the evaporator. The thickener overflow is forwarded to a dilution tank and raw water is added to the concentrated high Mg thickener overflow to dilute it to 90% saturation before transfer to the storage tank. The high Mg brine is further diluted to 75% saturation before disposal by deepwell injection.

In the Low Mg feed preparation circuit, the mixed NaCl/KCl solid from the evaporation solid-liquid separation is dissolved in two agitated low Mg feed repulp tanks by the hot lean recycle brine. The slurry is fed to the low Mg thickener where the undissolved NaCl and insolubles settle in the underflow. Flocculant solution can also be added to the thickener feed if there are a lot of insolubles entering the circuit during upset conditions. The thickener underflow is monitored for undissolved KCl content and will be returned to the low Mg feed repulp tank under upset conditions. In normal operation, the Mg content is maintained at between 12 gm and 25 gm $MgCl_2$ per 100 gm of water. If not, the NaCl will co-precipitate with KCl in the crystallizers to lower the KCl product grade; the thickener underflow is also sent to solid-liquid separation and the liquid is recycled back to the thickener feed. The higher percentage $MgCl_2$ will obviously require higher temperature solution, for example, 80° C. The NaCl solid will be delivered to agitated dissolution repulp tanks where raw water is added to dissolve the NaCl solid to about 90% saturation before the solution is pumped to the storage tank and it is further diluted to 75% saturation for deepwell injection.

The low Mg thickener overflow slightly unsaturated with KCl is feed for the three stage counter-current low Mg crystallizers. The crystallizers are operated at 25-35% solid density. The feed solution enters the 1st stage crystallizer where the solution is cooled down, KCl is precipitated and water is evaporated. The KCl slurry is pumped to the 2nd stage crystallizer. Similarly, the overflow solution from 1st stage crystallizer is forwarded to 2nd stage crystallizer. The operation and function of 2nd and 3rd stage crystallizer is the same as 1st stage crystallizer. Water is added to each crystallizer to make up the volume of water evaporated to prevent NaCl from precipitating. The 3rd stage crystallizer is cooled by the water coming from the cooling tower. The overflow solution from 3rd stage crystallizer is used to cool 2nd stage crystallizer and then to cool 1st stage crystallizer. The overflow is then heated in the plate heat exchangers before it is delivered to the low Mg feed repulp tank for reuse as the dissolution medium and part of the solution is forwarded to the evaporators to bleed off the Mg and water accumulated in the circuit and to recover the KCl.

The KCl slurry from the 3rd stage crystallizer is sent to the solid-liquid separation stage. The liquid is forwarded to the solution transfer of the tank and then heated in a plate heat exchanger for reuse (for dissolution) of the KCl/NaCl mixed solid. The KCl solid is delivered to the drying and compaction area from the solid-liquid separation.

In the drying and compaction circuit, the KCl solid from the low Mg crystallization is sent to a rotary dryer via a screw conveyor. The potash is dried at a high temperature. The dryer discharge is flowed through a scalping screen and the lumps from the screen are manually broken. The screen undersized crystals are recycled to the bucket elevator. The combined material is conveyed to the feed bin and then discharged to the compactors where the fines are converted to chicket faun under pressure, the chicket product is sent to the screens via a bucket elevator to remove the fines. The chicket product is delivered to the product storage bin and then conveyed to the truck loadout. The fines are recycled to the feed bin. The dryer exhausted air is passed through cyclones and then electrostatic precipitator to remove fines. The dust from the drying and compactor area is collected by the baghouse, which is also recycled back to the feed bin.

The insolubles from the low Mg crystallization circuit are trucked to the insoluble storage area which is lined with plastic liners to prevent brine leakage. This area is surrounded by ditches and is monitored by wells. Contaminated surface water collected from the plant site is pumped to insoluble storage area. The brine drained from the insoluble pile and water collected in the insoluble storage area, combined with the unsaturated NaCl brine and high Mg brine from the storage tanks in the process areas are injected for deepwell disposal.

In the reagent make-up area, flocculant and anticaking reagent are delivered and stored. Reagent mix tanks and distribution systems (pumps, heaters. piping and instrumentation) are installed to provide proper strength distributing to the production areas and adding to the process.

In the utilities area, boilers, compressors and associated process equipment and distribution system are installed to supply process water, process air, instrumentation air, electric power, steam and natural gas to the varied process areas.

In greater detail, the purpose of the solution preparation is to separate the insolubles in the saturated high and low Mg solution from the underground mineral seams, to provide proper solution for evaporation and to transport the insolubles to storage for future processing.

Hot water 12 is pumped by pumps 14 and 16 underground at 18 and 20 to dissolve the potassium and magnesium minerals. After the solutions are saturated with minerals, high Mg and low Mg solutions are pumped by pumps 22 and 24 from the underground to a solution preparation thickener 26 where the insolubles settle to the bottom of the thickener. Flocculant solution is added to the solution preparation thickener feed slurry. The thickener overflow is discharged to the solution preparation thickener overflow transfer tank 26, and then pumped by pump 28 to the solution preparation thickener solution storage tank 30 which has a storage capacity of 0.5 hour. The storage tank 30 has a conical bottom. The solids accumulated may be recycled by pumping with pump 32 back to the 30. The solution preparation thickener overflow solution 34 is forwarded to the evaporation area 36.

The solution preparation thickener underflow, at less than 35% solids is either recycled to the thickener and more than 35% solid is forwarded via pump 38 to an insoluble filter 40. Wash water 42 is added to displace the contained brine. The filter cake is discharged to a truck 44 which is transported to the insoluble storage area 46. The filtrate associated with some solids via filtrate tank 48 is recycled via pump 50 to the thickener.

The purpose of the evaporation is to precipitate the mixed KCl/NaCl salts from the solution preparation thickener 26 overflow solution by evaporating the water under vacuum. The final evaporated solution is at 49.2 gm $MgCl_2$/100 gm $H_2O$ and contains minimal of KCl and NaCl.

Solution preparation thickener solution 34 is heated by an evaporator feed heat exchanger 50 and then combined with the mixed salt slurry 52 before feeding to the suction of the evaporator circuiting pumps, 52, 54, 56 of the three evaporators 58, 60, 62.

Each evaporator 58, 60 and 62 has a recirculation pump 52, 54, 56, a heat exchanger 64, 66 and 68 and a steam injector 70, 72 and 74. The slurry combined with the feed solution is circulated through the heat exchanger where it is heated by steam supplied by utilities, globally denoted by 76. The water is evaporated and low pressure steam is produced to supply a heat to the next evaporator stage globally denoted by numeral 78. The mixed KCl/NaCl salts are precipitated out from the solution and discharged to the agitated evaporation thickener feed tank discussed with respect to FIG. 3.

Figure 2:
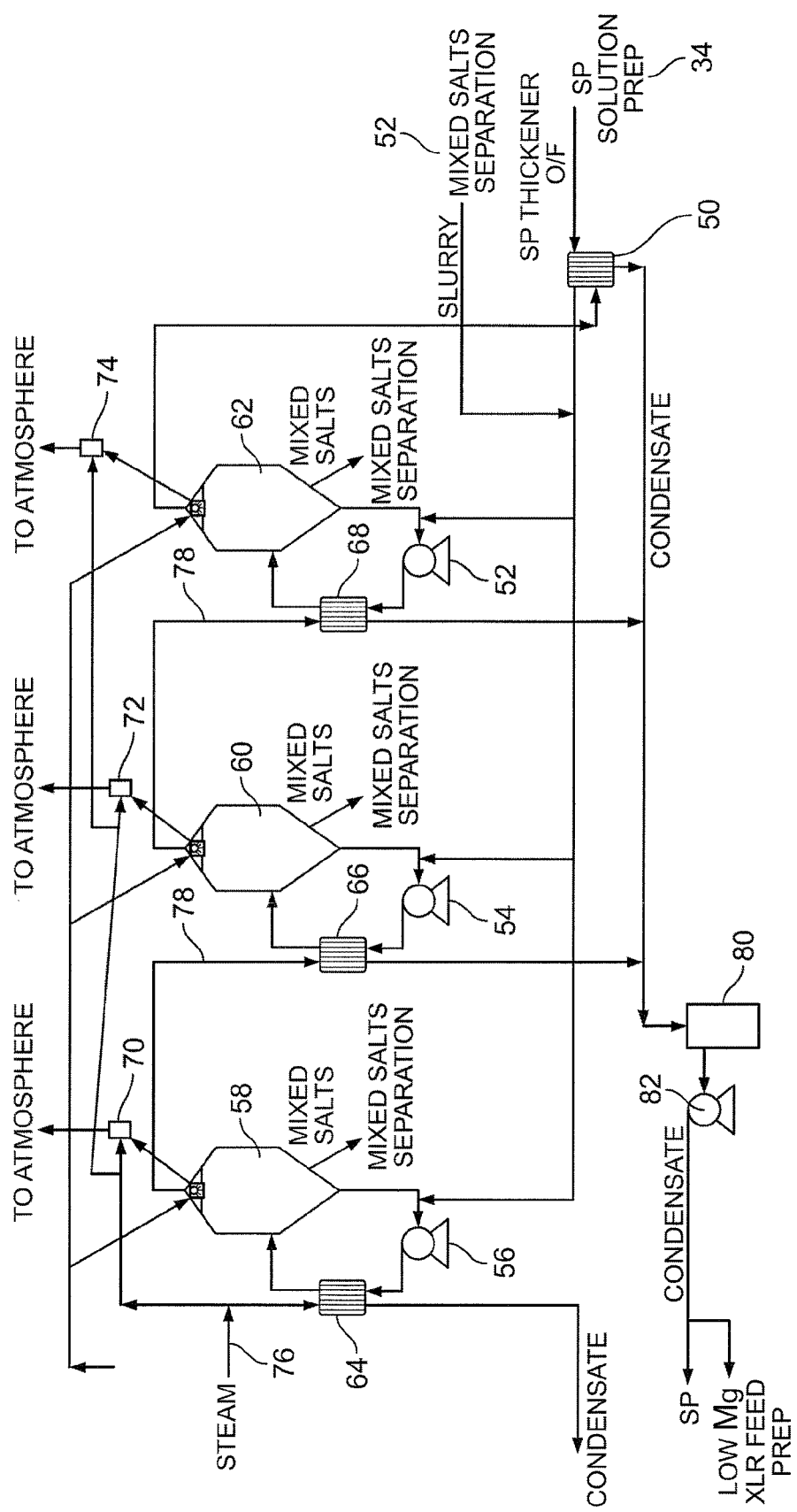
FIG. 2 is a process flow diagram illustrating the process operations.

The condensate from the heat exchanger is collected in the condensate tank 80 and then pumped by pump 85 (FIG. 2) for reuse in various areas in the plant or recycle to utilities.

Figure 3:
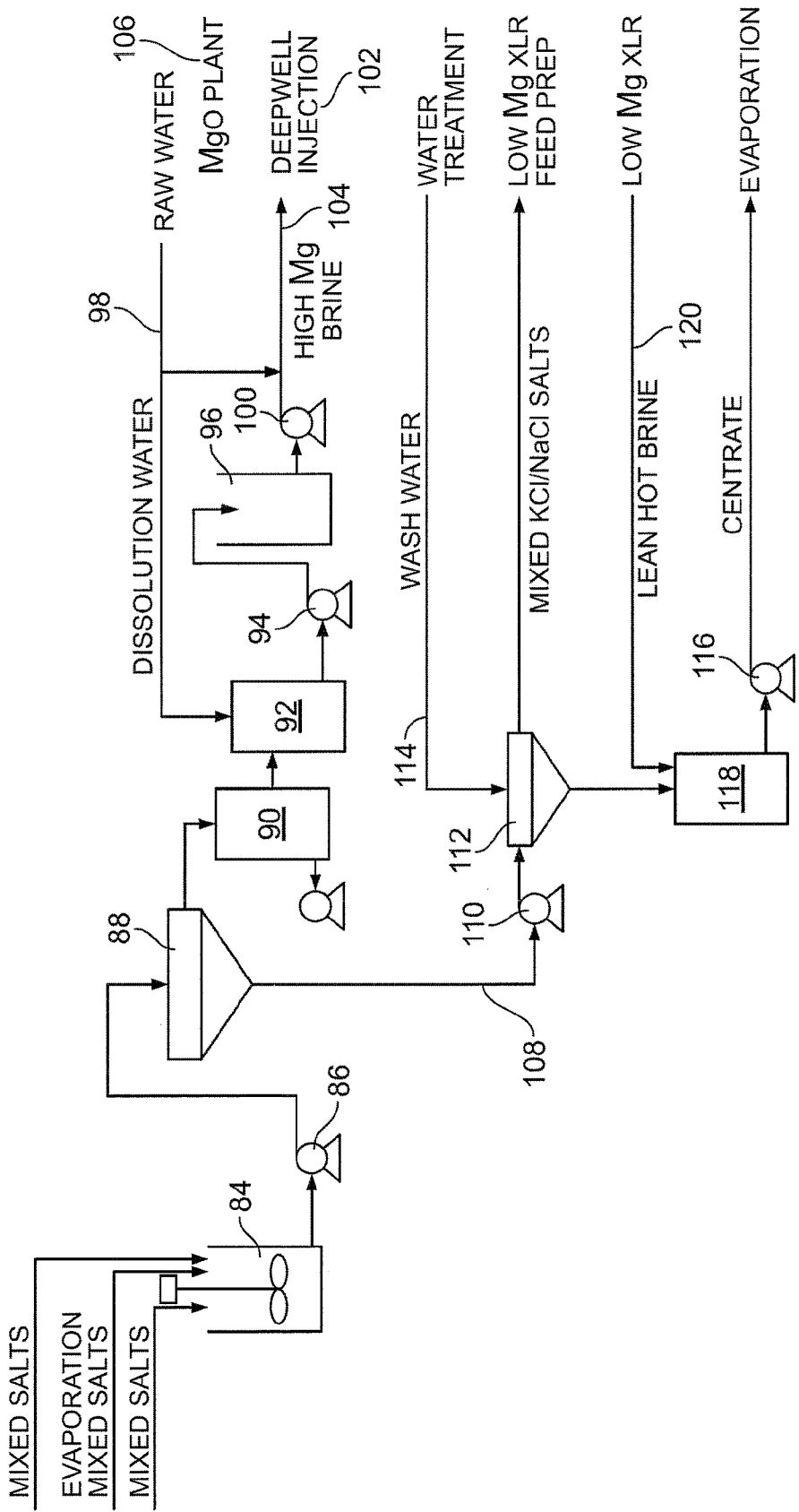
FIG. 3 is a process flow diagram illustrating the unit operations involved in the mixed salt separation process.

Referring to FIG. 3, shown in the circuit for mixed salt separation. The mixed KCl/NaCl discharged to evaporation thickener fuel tank 84.

The mixed salts separation circuit is used to debrine the mixed KCl/NaCl salts and control the amount of the Magnesium content entering the crystallization.

Mixed salts slurry is pumped by pump 86 to the evaporator thickener 88 where the solids are densified in the underflow. The thickener overflow is discharged to an evaporator thickener over flow tank 90 and then overflows to a high Mg dilution tank 92. The high Mg brine is pumped by pump 94 to storage tank 96. Dilution water 98 is added to the high Mg brine to keep the brine under saturated before it is transferred by pump 100 to dispose by deepwell injection denoted by numeral 102. The high Mg brine 104 will be delivered to a MgO plant 106 to recover magnesium.

The evaporation thickener underflow denoted by numeral 108, at about 45% solids is pumped by pump 110 mixed salts centrifuges 112. Wash water 114 is added to displace the contained brine and reduce the Mg content entering crystallization. The mixed salts solid is discharged by pump 116 to the agitated repulp feed tank (FIG. 4) in the low Mg feed prep area. The filtrate flows by gravity to evaporation filtrate tank 118 and lean hot brine 120 (from XLR) is added to maintain the tank level. The slurry is then sent to the evaporation circuit in FIG. 2.

The purpose of the crystallization feed preparation circuit is to dissolve the KCl from the mixed KCl/NaCl salts and separate the NaCl for disposal.

Mixed salts are discharged to a series of two agitated repulp feed tanks 122, 124 from FIG. 3 mixing with the recycle hot lean brine 120 from crystallization to dissolve KCl in the solution. The slurry is pumped by pump 126 to a low Mg thickener 128 where NaCl salts settle to the underflow. The thickener overflow 130 is discharged to low Mg thickener overflow tank 132 and then by pump 134 to the 1st stage crystallizer (FIG. 5).

The thickener underflow, below 35% solids is recycled back to the thickener 128 and above 35% solids is pumped by pump 136 to NaCl centrifuges 138. Wash water 140 is added to displace the contained brine to recover KCl. The centrate 140 containing fine solids is recycled by pump 142 to thickener 128. The solid cake is discharged to two agitated NaCl repulp tanks 144, 146 where raw water is 148 added to dissolve the NaCl. The solution is pumped by pump 148 to storage tank 150. The dilute NaCl solution is pumped by pump 152 to dispose by deepwell injection 154 underground. The NaCl solid could also be slurried with $CaCl_2$ brine to dispose in the underground caverns.

The purpose of the low Mg crystallization circuit is to separate KCl and NaCl from the mixed KCl/NaCl salts by dissolving KCl in the hot lean brine to saturation and precipitating high purity KCl by cooling under vacuum. NaCl in solution will be recirculated in the closed circuit. The circuit is operated in the region of Mg below 12 gm/100 gm $H_2O$ to prevent co-precipitate KCl and NaCl in the crystallization process and produce low quality potash.

Figure 4:
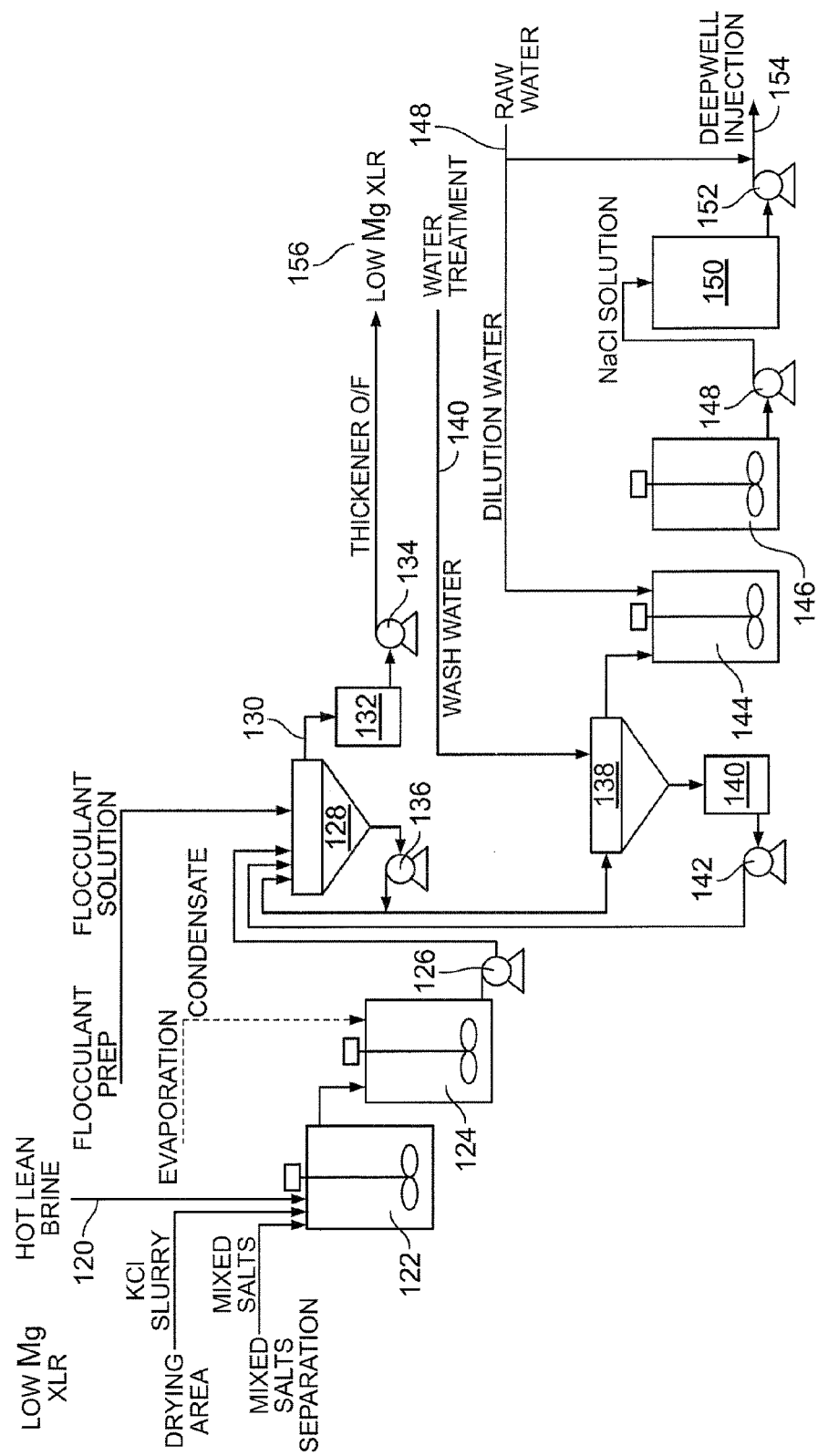
FIG. 4 is a process flow diagram illustrating the unit operations involved in the low magnesium feed preparation process.
Figure 5:
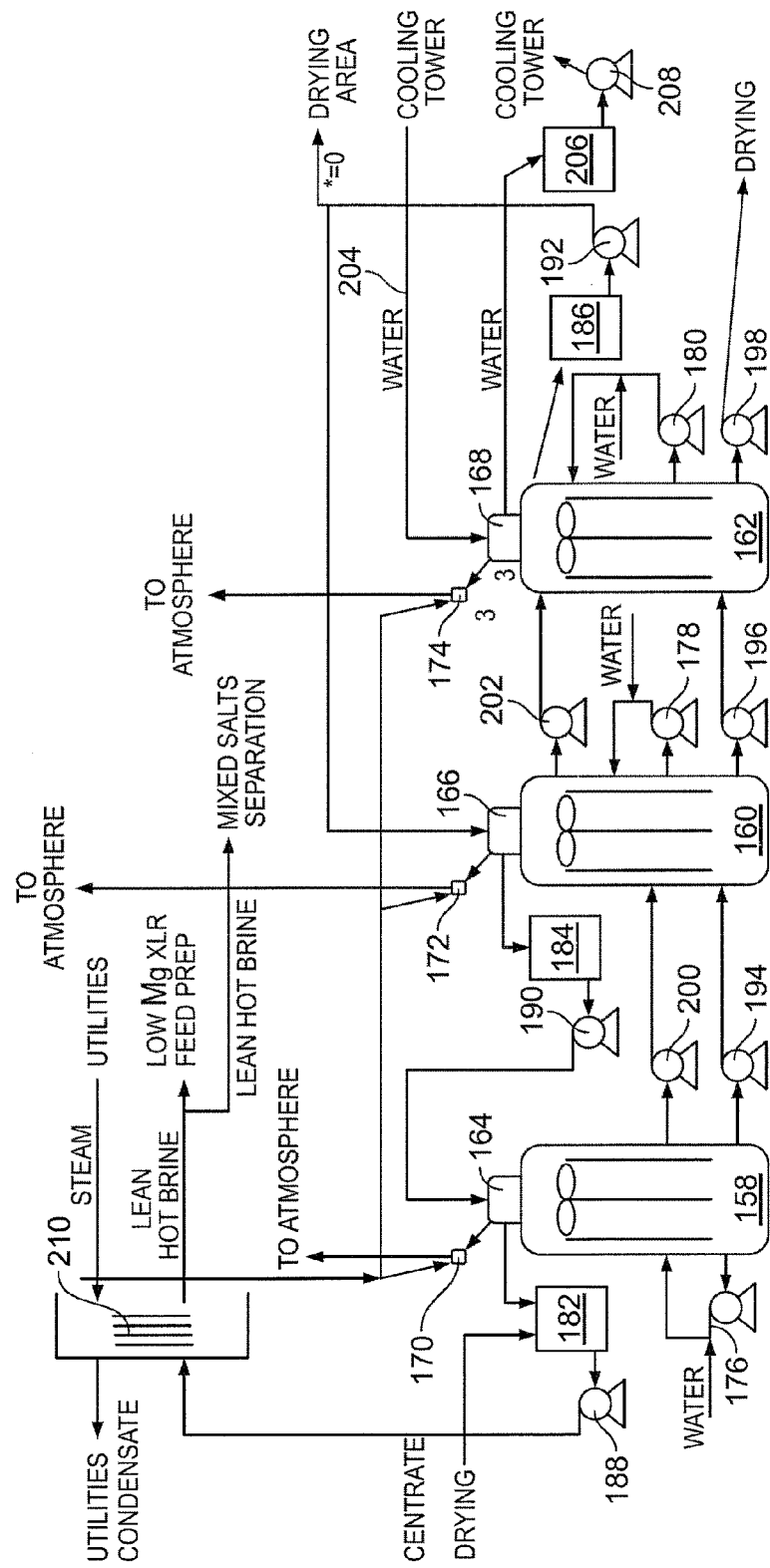
FIG. 5 is a process flow diagram depicting the unit operations involved in the low magnesium crystallization process.
Figure 6:
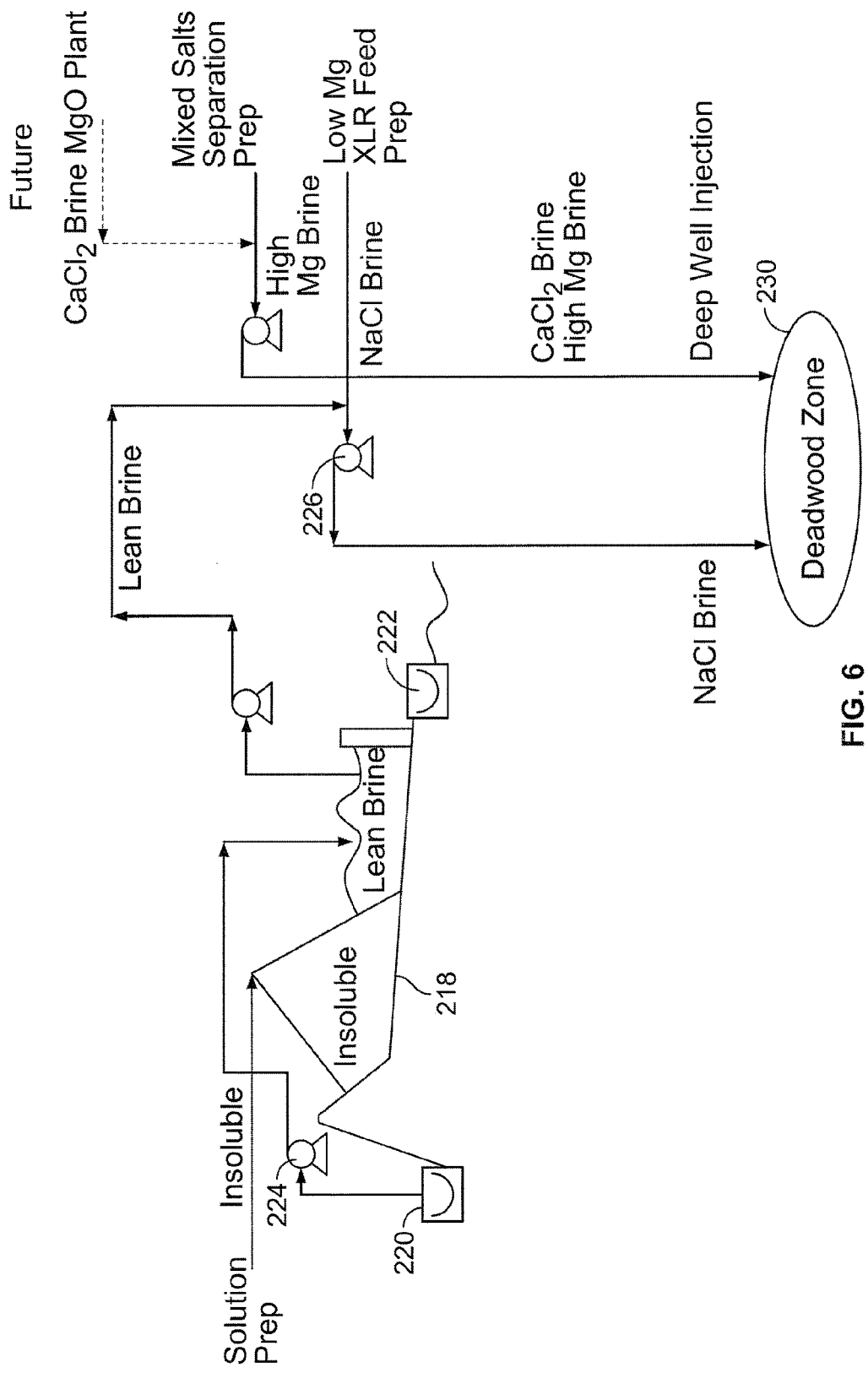
FIG. 6 is a process flow diagram depicting the unit operations involved in the tailings disposal process.

Turning to FIG. 5, the XLR thickener overflow 156 from FIG. 4 is pumped by pump 134 to 1st stage crystallizer 158 and then pumped to 2nd 160 and 3rd 162 stage crystallizers 164-168.

Each crystallizer 158-162 consists of a condenser 164-168, an ejector 170-174, a recirculation pump 176-180, a solution transfer tank 182-186 and a transfer pump 188-192, slurry transfer pump 194-198 and an overflow transfer pump 200, 202 in crystallizers in 160 and 162.

Figure 9:
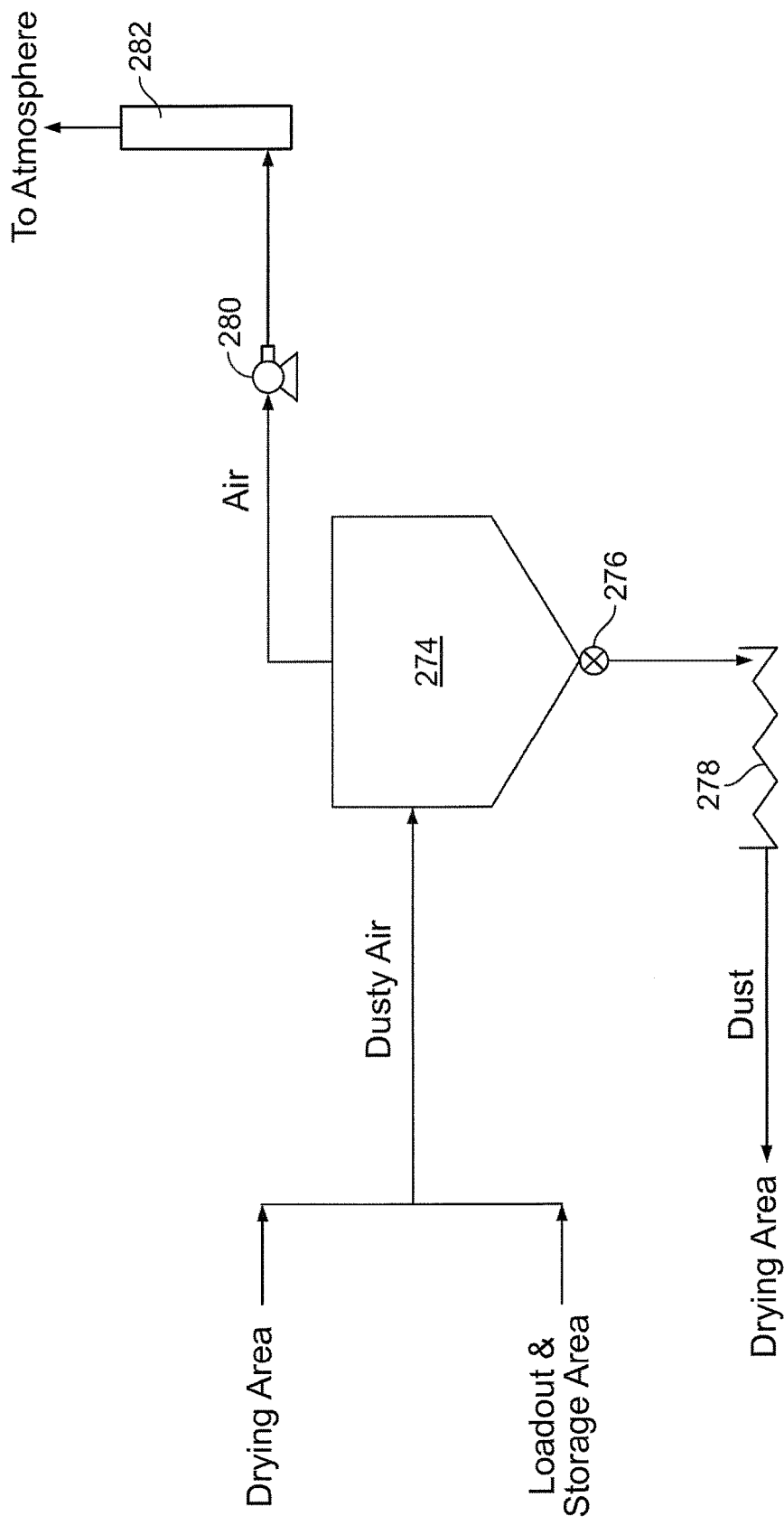
FIG. 9 is a process flow diagram illustrating the plan dust collection process.

The 3rd stage crystallizer 162 is cooled by the water 204 from the cooling tower (FIG. 9, discussed herein after). The warm water is flowed by gravity to transfer tank 206 and pumped by pump 208 to the cooling tower (FIG. 9) to remove heat. The overflow solution from crystallizer 162 is used to cool 2nd stage crystallizer 160 and then to cool 1st stage crystallizer 158, combined with XLR centrate. The resultant warm overflow is pumped by pump 188 and heated in plate heat exchangers 210 before it is circulated back to the low Mg feed repulp tank 122 for reuse as the dissolution medium and part of the solution is also forwarded to the evaporators via the evaporation centrate tank 118 (FIG. 3) to bleed off the Mg and water accumulated in the circuit and recover the KCl from the brine.

Figure 7:
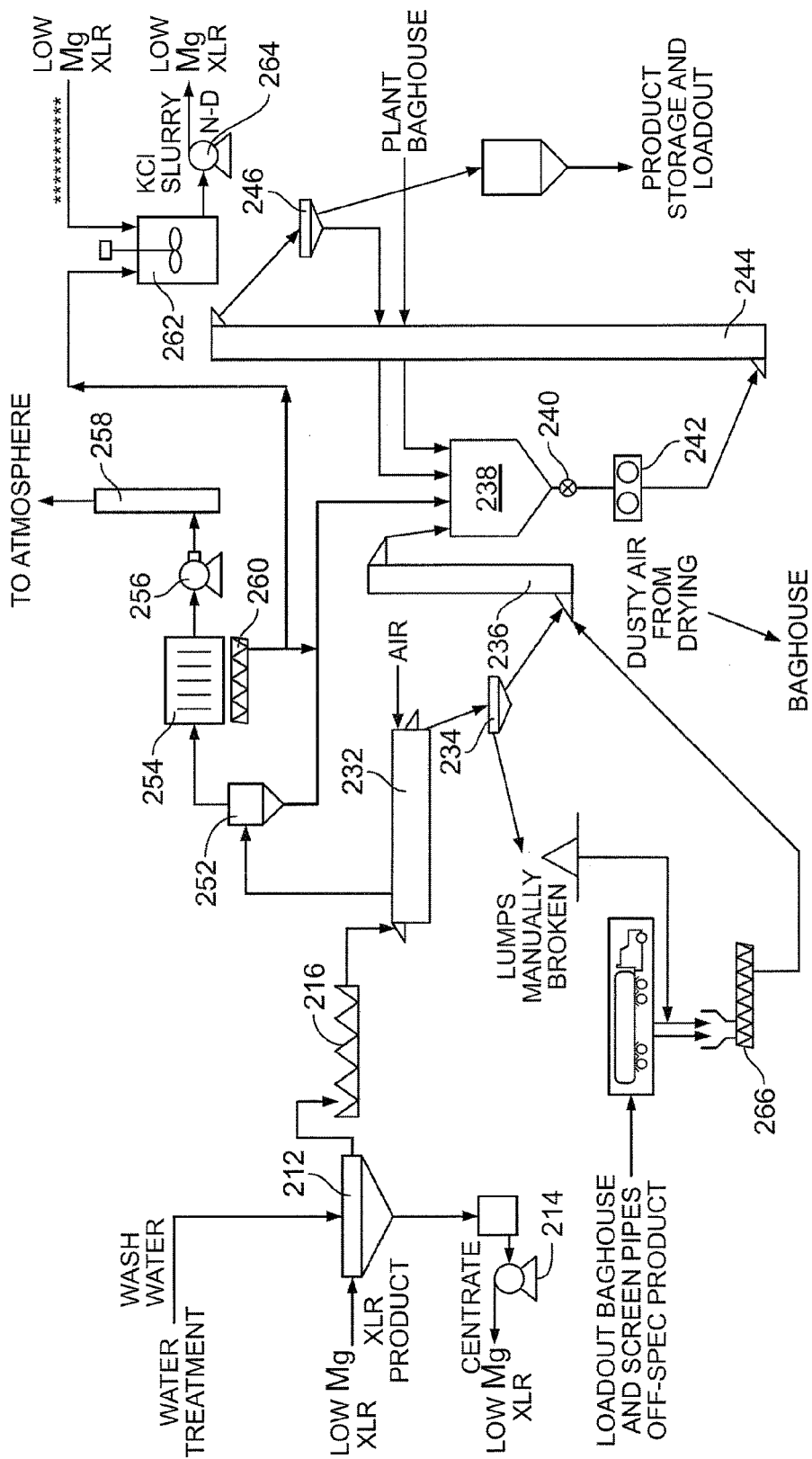
FIG. 7 is a process flow diagram illustrating the unit operations involved in the drying and compaction process.

The KCl product slurry from 3rd stage crystallizer 162 is pumped by pump 98 to a separator 212 (FIG. 7) with the centrate being transferred by pump 214 to XLR solution tank transfer tank 182 (FIG. 5) and also heated in the plate heat exchangers 210 for reuse for dissolution of KCl/NaCl mixed solid. The KCl solid from the solid-liquid separation 212 is delivered at 216 to the drying and compaction area (discussed herein after).

The purpose of the tailings disposal is to provide the storage space to store insolubles from the process for further processing in the future and facilitate brine disposal of high Mg brine, NaCl brine and contaminated surface brine by deepwell injection.

Insolubles from the solution preparation steps are trucked 44 (FIG. 1) and stored in an insolubles storage area 218 surrounded by containment ditches 220, 222 and monitored by wells. Contaminated surface water collected from the ditches 220, 222 is pumped by pumps 224 back to insoluble storage area 218. The contaminated solution includes brine draining from the insoluble pile collected in the insoluble storage area 218, combined with the unsaturated NaCl brine from storage tank are pumped by pump 226 and disposed underground to a deadwood zone 230. The high Mg brine 104 (FIG. 3) from the storage tank in the mixed salts separation area is injected by pump 142 (FIG. 4) deepwell disposal via series stages of pumping.

The product from the low Mg crystallization area is conveyed by conveyor 216 to dry in rotary dryer 232. The dry product is discharged to a scalping screen 234. The material lumps are manually broken and recycled to the circuit. The screen undersize is discharged to a bucket elevator 236 and transferred to dryer D/C bin 238. The fines are then discharged to compactors 240 which convert the fines to chicket form. There are then conveyed by conveyor 244 and screened at to remove the fines. The chicket product is flowed to the product bin 248. The screen fines and baghouse 250 dust are recycled to dryer D/C bin 238.

The dusty exhaust from the dryer 238 first passes a set of cyclones 252 to recover the fines which are recycled to dryer D/C bin 238. The exhausted gas is further passed into the electrostatic precipitator 254 to remove the very fine dust before emitting by pump 256 and stack 258 to the atmosphere. The dust collected is conveyed 260 either to the dryer D/C bin 238 or dust slurry tank 262 and then transferred by pump 264 to low Mg feed preparation area (FIGS. 4 and 5).

Off-specification product, recycle baghouse fines and broken lumps at the control rate are recycled to the circuit through off-spec unloading screw conveyors 266.

Figure 8:
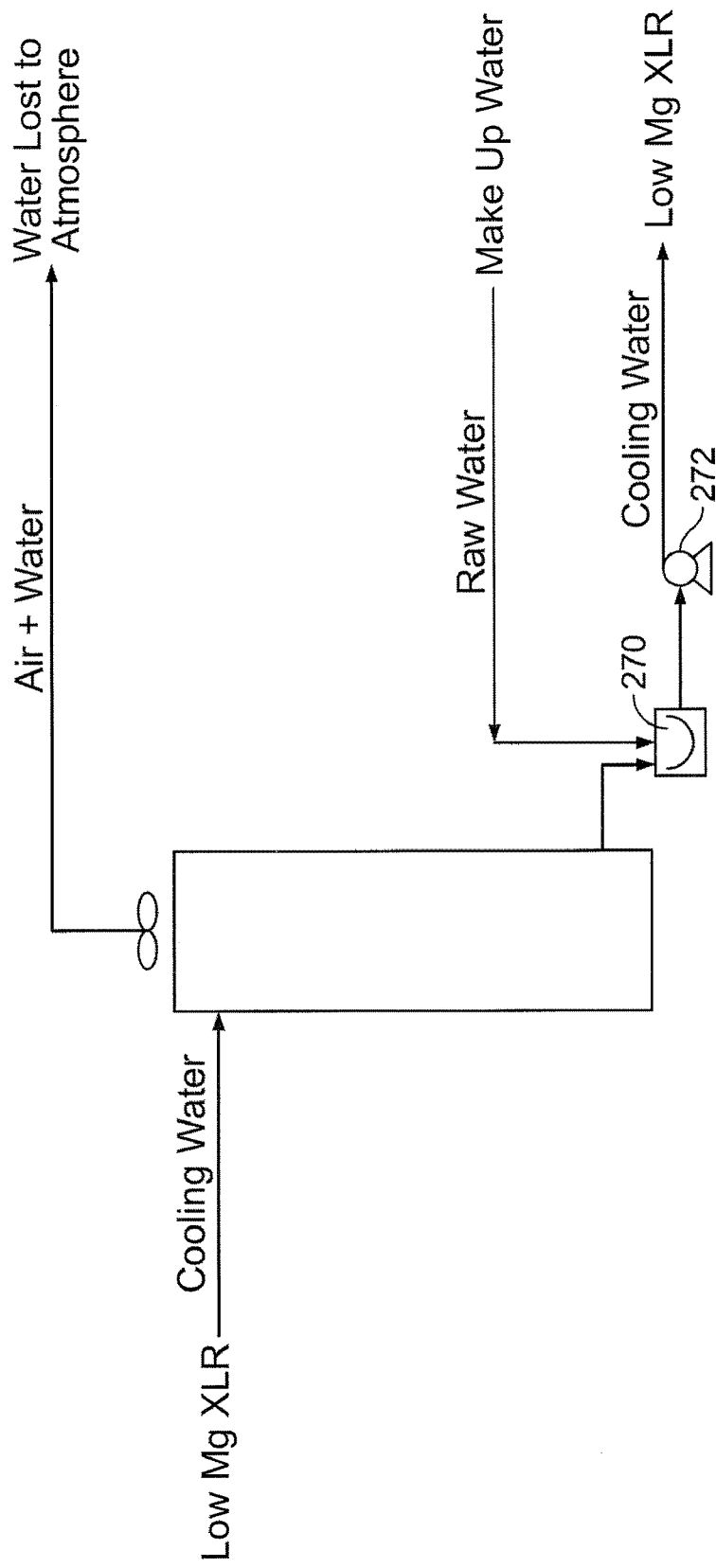
FIG. 8 is a process flow diagram illustrating the cooling tower process.

Referring now to FIG. 8, shown is a cooling schematic for use in the process.

The purpose of the cooling tower circuit is to cool the recirculation water which is used to remove heat and to cool the third stage crystallizer 162. The water is reused continuously as this minimizes water consumption with only small amount of make-up water addition due to evaporation loss.

Warm water used to remove heat in the 3rd stage crystallizer condenser 168 is sent to the top of cooling tower 270. The warm water is cooled down by passing air through the water. The cooled water discharged from the tower 270 and pumped back by pump 272 for reuse in 3rd stage crystallizer condenser 168 repeatedly. Water is added to the cooling tower 270 to make up water loss due to evaporation.

The purpose of the plant dust collection circuit is to remove dust from the plant and maintain good hygiene in plant environment.

Dusty air from drying and compaction area, and product loadout and storage area are cleaned up by the plant baghouse 274, the dust collected by the bags is discharged at 276 from the baghouse and transferred at 278 to dryer D/C bin 238 (FIG. 7) to reprocess. The dust free air is pumped by pump 280 to stack 282 and then to the atmosphere.

Figure 10:
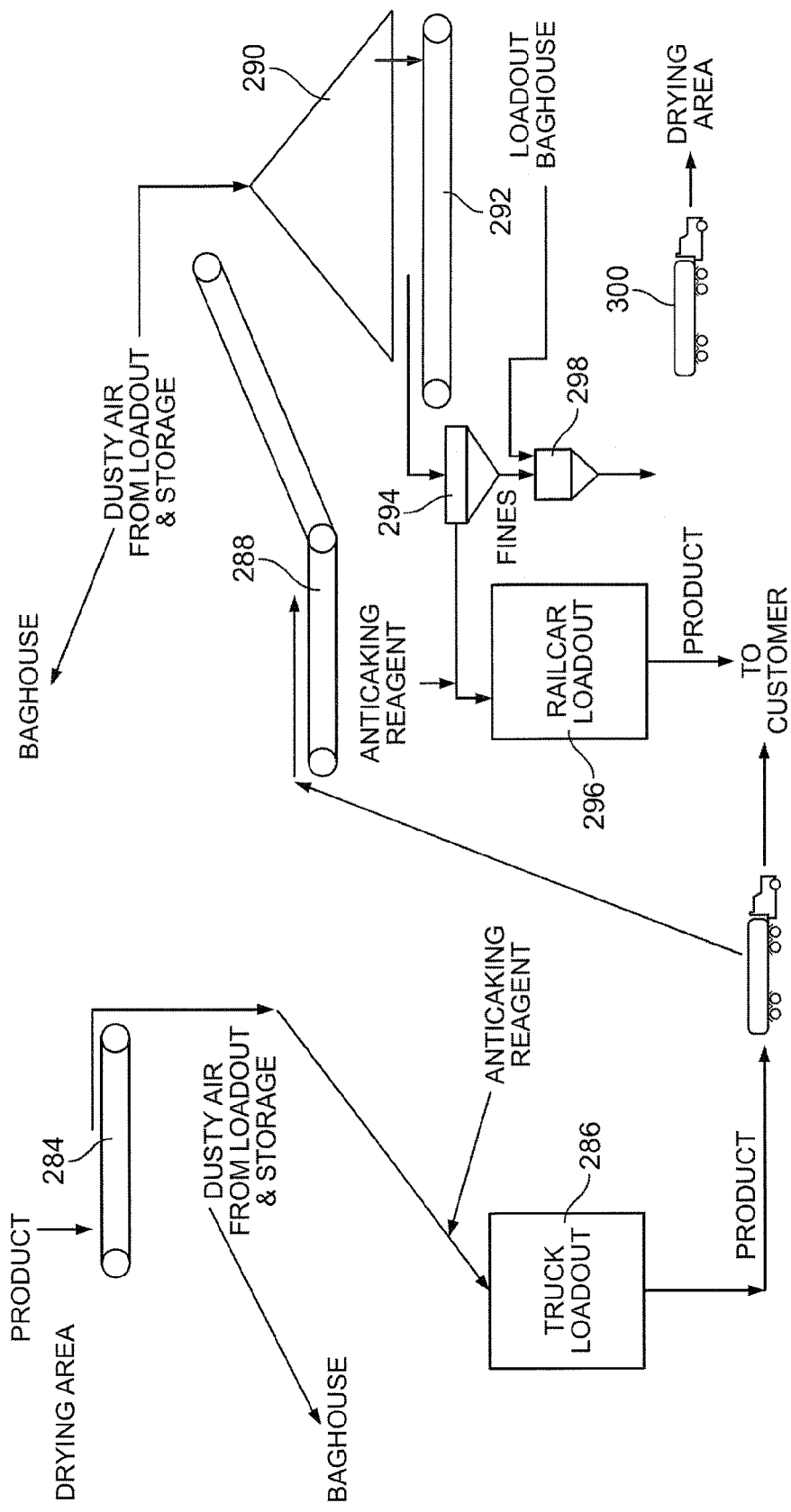
FIG. 10 is a process flow diagram illustrating operations involved in product storage and loadout process.

Turning to FIG. 10, shown is a product loadout and storage schematic.

From the drying and compaction area, chicket product is conveyed by conveyor 284 to the truck loadout 286, the product could be either delivered to the customer or transported to dump on conveyor 288 and then stored in the product silo 290 away from the plant site and proximate railways. The product is reclaimed at 290, screened at 294 and loaded 296 to the railcars.

Anticaking reagent is added to the product at the loadouts to enhance handling and prevent caking. The screen fines combined with the loadout baghouse fines are stored in the fines bin 298 and are trucked back 300 to the plant for reprocessing.

Figure 11:
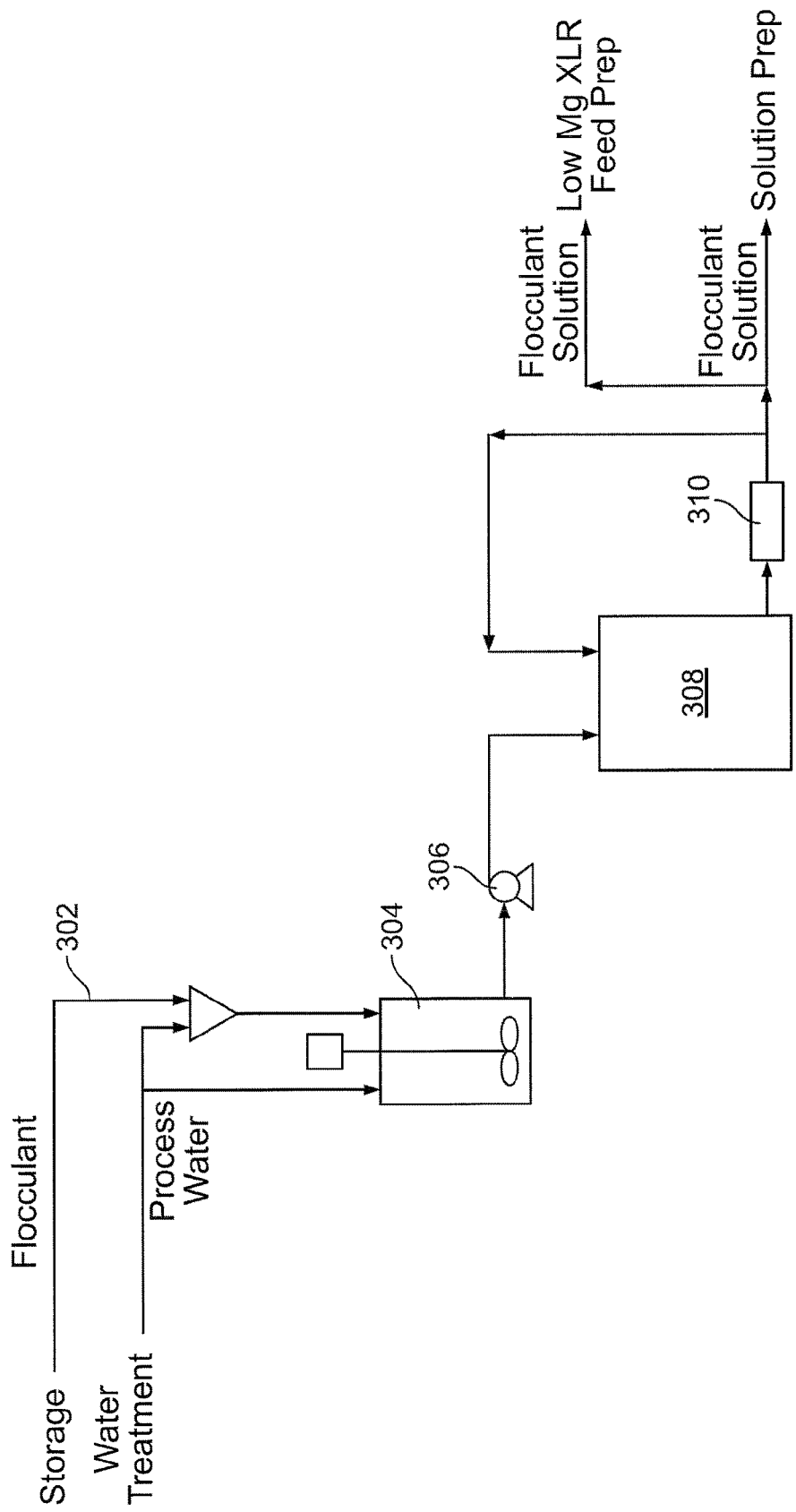
FIG. 11 is a process flow diagram illustrating the unit operations incorporated in the flocculant preparation process.

Referring now to FIG. 11, shown is a schematic illustration of the flocculant preparation for the process.

Flocculant 302 from storage is put into a agitating mixing tank 304 filled with process water. The prepared flocculant solution is transferred by pump 306 to storage tank 308. It is then added at 310 to the thickeners or recycled back to storage tank 308.

Figure 12:
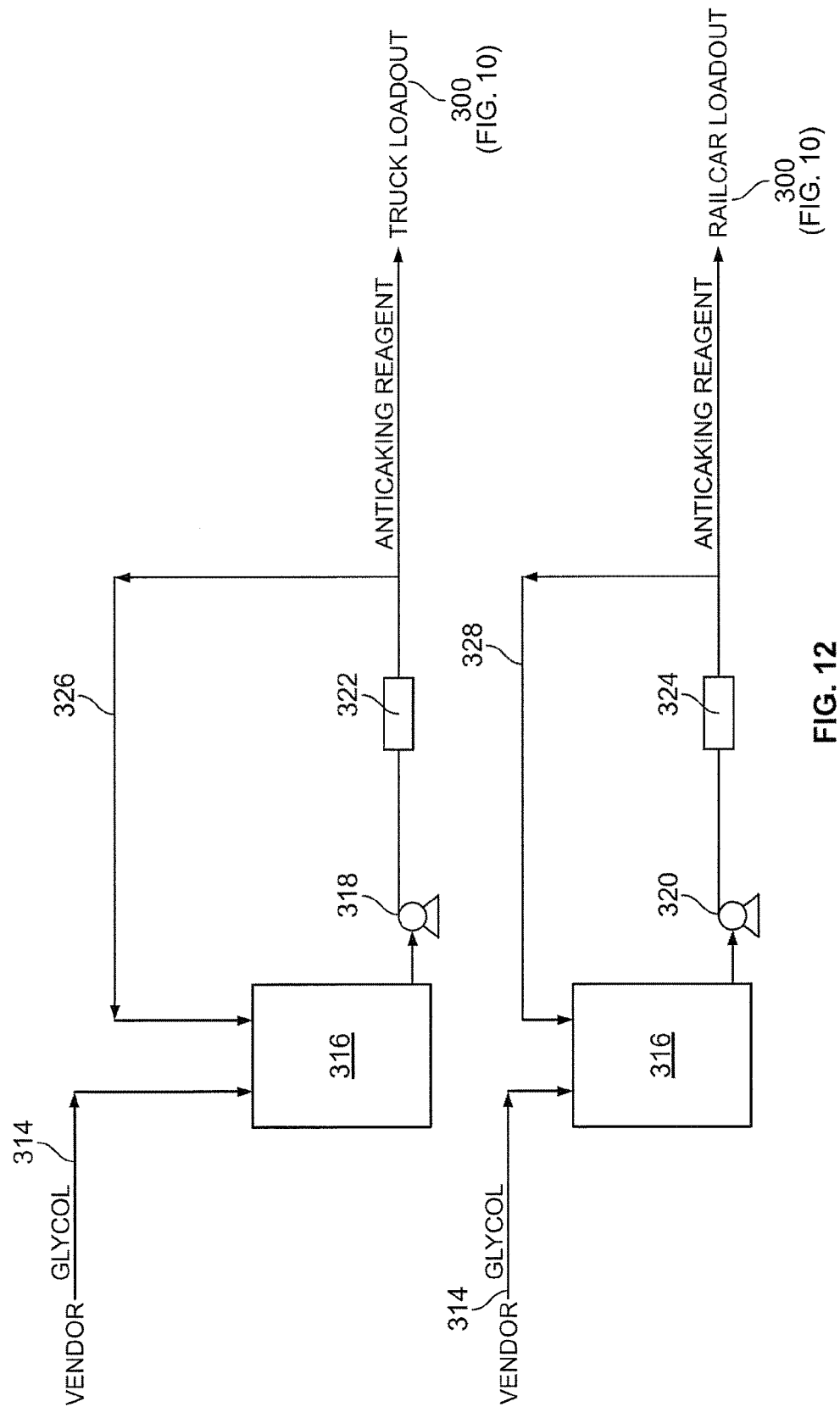
FIG. 12 is a process flow diagram illustrating the anti-caking reagent distribution process.

With reference to FIG. 12, an anticaking reagent distribution circuit is shown. This is to store the anticaking reagent, distribute to the loadout areas and add and the product to enhance product handling and prevent caking during transport and storage.

As an option, there may be one anticaking reagent distribution system at each loadout. The anticaking reagent which may comprise glycol is delivered to holding tanks 316. The anticaking reagent 314 is pumped by pumps 318, 320 to heaters 322, 324 to distribute to the loadout areas. The reagent 314 is added at the required dosage to the product. Part of the reagent is recycled at 326, 328 back to a respective holding tank. Optionally, $NaCO_3$ may be added to the KCl product to immobilize the $MgCl_2$ prior to formulation to prevent moisture absorption in the final product.

Figure 13:
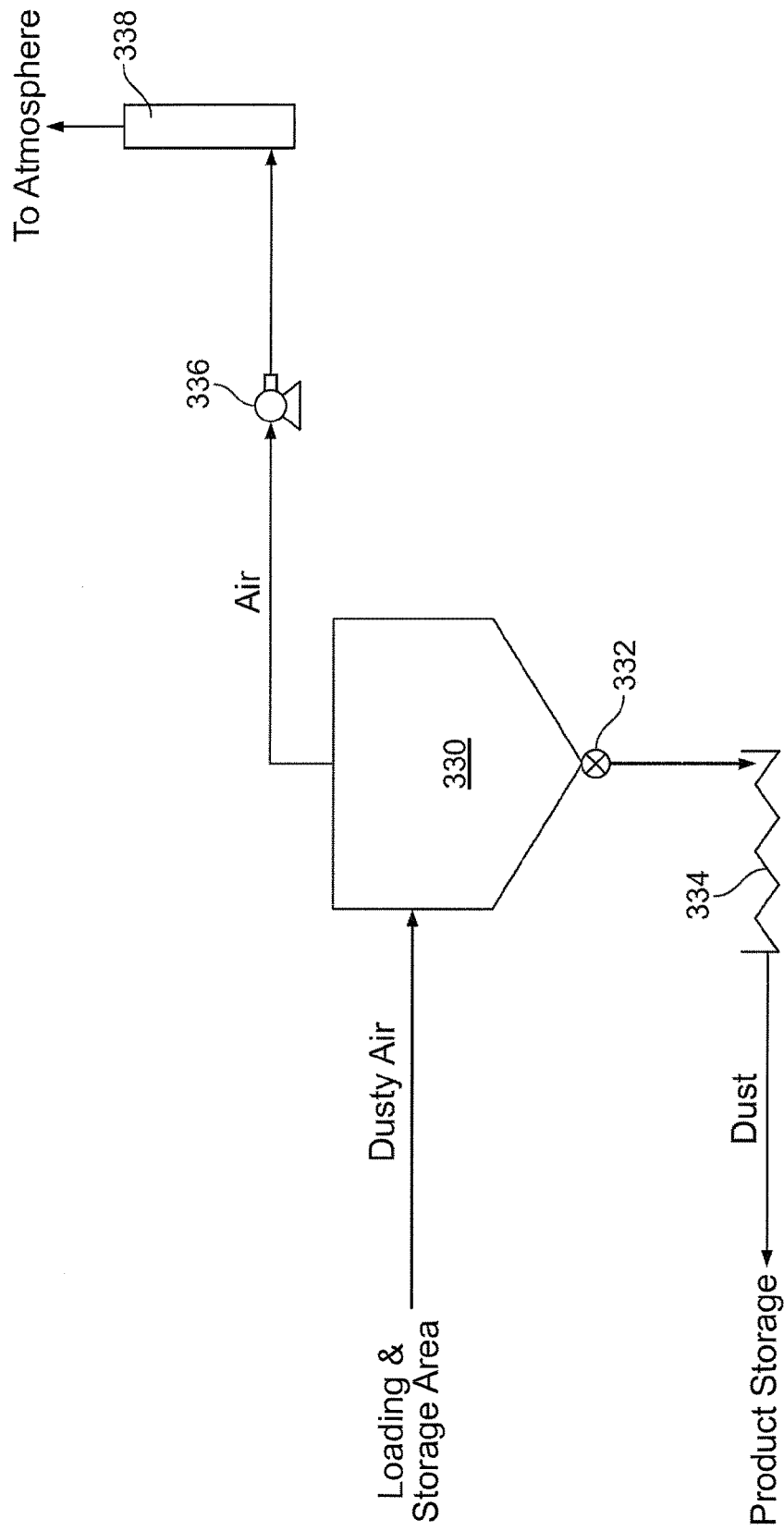
FIG. 13 is a process flow diagram illustrating the operations involved in the loadout dust collection process.

FIG. 13 illustrates, schematically the loadout dust collection circuit. Dusty air from product loadout and storage area (FIG. 12), is cleaned up by a loadout baghouse 330, the dust collected by the bags is discharged at 332 from the baghouse and transferred by, for example, conveyor 334 to fines bin and then trucked back to the plant for reprocess. The dust free air is pumped by pump 336 to stack 338 to the atmosphere.

Although embodiments of the invention have been described above, it is limited thereto and it will be apparent to those skilled in the art that numerous modifications form part of the present invention insofar as they do not depart form the spirit, nature and scope of the claimed and described invention.

What is claimed is:

1. A method of formulating potassium chloride from a source of carnallite, comprising:

providing a source of carnallite;

dissolving said source of carnallite to result in a solution at least containing sodium chloride, potassium chloride, and magnesium chloride;

removing undissolved said sodium chloride;

maintaining, absent addition of magnesium chloride, undersaturation of the magnesium chloride concentration existing in the solution in a range between 12% and 25% by weight throughout said method to prevent co-precipitation of any sodium chloride with potassium chloride; and crystallizing potassium chloride from said solution with a sodium chloride of not greater than 2% by weight, whereby said potassium chloride has a high purity.

2. The method as set forth in claim 1, wherein said crystallizing of said potassium chloride is performed in a plurality of crystallizers.

3. The method as set forth in claim 2, wherein said crystallizers are sequential.

4. The method as set forth in claim 1, further including the step of adding make-up water to said solution to prevent precipitation of sodium chloride during said crystallizing of said potassium chloride.

5. The method as set forth in claim 1, wherein said source of carnallite is a subterranean source.

6. The method as set forth in claim 1, further including the step of adding flocculant to dissolved carnallite to flocculate insoluble compounds present therein.

7. The method as set forth in claim 6, wherein said insoluble compounds are stored.

8. The method as set forth in claim 1, wherein removed sodium chloride from said solution is deep well injected.

9. The method as set forth in claim 1, wherein said magnesium chloride is crystallized.

10. The method as set forth in claim 1, further including the step treating said potassium chloride with an anti-caking agent.

* * * * *